United States Patent [19]

Genbauffe et al.

[11] 4,442,875

[45] Apr. 17, 1984

[54] PROPELLANT CHARGING HEAD FOR FILLING A STORAGE CHAMBER OF A PROPELLANT STORAGE CONSTRUCTION

[75] Inventors: Francis S. Genbauffe, Irwin; Joseph J. Erdelsky, Jeannette, both of Pa.

[73] Assignee: Robertshaw Controls Company, Richmond, Va.

[21] Appl. No.: 328,959

[22] Filed: Dec. 9, 1981

[51] Int. Cl.³ .......................... B65B 3/04; B67C 5/37
[52] U.S. Cl. ................................... 141/348; 137/226; 137/234
[58] Field of Search ................ 141/311 R, 285-310, 141/346-362, 1-12, 113, 319, 320, 321, 322; 137/226, 232, 233, 234

[56] References Cited

U.S. PATENT DOCUMENTS 881,241 3/1908 Hubbard .............................. 141/311
1,861,936 6/1932 Payne ................................... 137/234

Primary Examiner—Houston S. Bell, Jr.
Attorney, Agent, or Firm—Candor, Candor & Tassone

[57] ABSTRACT

A propellant charging head for filling a storing chamber of a propellant storage construction with a charge of propellant and method of making the charging head are provided, the head being adapted to be disposed against the construction and have a projection of the head engage a valve plunger of a valve unit disposed in the passage of the propellant storage construction so that propellant can flow from the head through the open valve unit to the chamber, the head having a generally conical nose-like member that is adapted to seat against a generally conical seat of the construction to fluidly interconnect the head to the passage.

7 Claims, 6 Drawing Figures

PROPELLANT CHARGING HEAD FOR FILLING A STORAGE CHAMBER OF A PROPELLANT STORAGE CONSTRUCTION

BACKGROUND OF THE INVENTION

1. Field of the Invention

This invention relates to an improved propellant charging head for filling a storing chamber of a propellant storage construction with a charge of propellant and a method of making such a propellant charging head.

2. Prior Art Statement

It is known to fill a storing chamber of a propellant storage construction with a charge of propellant through a passage defining means of the construction that has a valve unit in the passage thereof by disposing a charging head against the construction and opening the valve unit with a projection of the head engaging a valve plunger of the valve unit so that propellant can flow from the head through the opened valve unit to the chamber.

For example, see FIG. 4 of the drawings of this application wherein such prior known charging head is illustrated and is adapted to thread onto a threaded end of an adapter of a propellant storage construction, such adapter for receiving the charging head of FIG. 4 of this application is set forth in the copending patent application Ser. No. 326,703, filed Dec. 2, 1981, wherein a pressure regulator unit is normally threaded to the externally threaded end of the adapter that has the passage passing therethrough and containing the valve unit therein, the adapter having its other end threaded into a threaded opening in a propellant storage container.

It is also known to provide a propellant storage construction having a chamber for storing the propellant and a passage defining means leading to the chamber and containing a valve unit therein for opening and closing the passage defining means, the construction having a removable pressure regulator unit interconnected thereto and being operatively associated with the valve unit for operating the valve unit in relation to the pressure of the propellant having passed through the valve unit. One of the passage defining means and the pressure regulator unit defines a generally conical seat adjacent the valve unit and on the side thereof opposite to the chamber and the other of the passage defining means and the pressure regulator unit has a generally conical nose-like member received in the seat to fluidly interconnect the pressure regulator unit to the passage means downstream from the valve unit. For example, see the copending patent application, Ser. No. 328,942, filed Dec. 9, 1981, and FIGS. 1-3 of this application.

SUMMARY OF THE INVENTION

It is one feature of this invention to provide an improved method and apparatus for filling a storing chamber of a propellant storage construction with a charge of propellant through a passage defining means of the construction that has a valve unit in the passage thereof by disposing a charging head against the construction and opening the valve unit with a projection of the head engaging the valve plunger of the valve unit so that propellant can flow from the head through the opened valve unit to the storing chamber.

In particular, the prior known means for filling the storing chamber of a propellant storage construction required the propellant charging head to be threaded onto a threaded end of the passage defining means of the propellant storage construction and thereafter required the threading inwardly a plunger of the charging head to engage against the plunger of the valve unit in the passage defining means to open that valve unit.

However, it was found according to the teachings of this invention that since the passage defining means of the propellant storage construction of aforementioned copending patent application, Ser. No. 328,942, filed Dec. 9, 1981, is formed with either a generally conical seat adjacent the valve unit and on the side thereof opposite to the chamber or with a generally conical nose-like member so that either the seat or the nose-like member of the passage defining means is seated against a nose-like member or a seat of a pressure regulator unit to fluidly interconnect that pressure regulator unit to the passage means downstream from the valve unit, a unique propellant charging head could be provided which would be compatible with such improved passage defining means to effectively seat therewith in a simple and effective manner without requiring a threaded relationship between the propellant charging head and the passage defining means of the propellant storage construction as in the past.

For example, one embodiment of the improved propellant charging head of this invention for filling a storing chamber of a propellant storage construction with a charge of propellant through a passage defining means of the construction that has a valve unit in the passage thereof comprises a propellant charging head being adapted to be disposed against the construction and having a projection of the head adapted to engage a valve plunger of the valve unit to open the valve unit so that propellant can flow from the head through the opened valve unit to the chamber, the head having a generally conical nose-like member that is adapted to seat against a generally conical seat of the construction to fluidly interconnect the head to the passage thereof.

Accordingly, it is an object of this invention is to provide an improved propellant charging head for filling a storing chamber of a propellant storage construction with a charge of propellant, the propellant charging head of this invention having one or more of the novel features of this invention as set forth above or hereinafter shown or described.

Another object of this invention is to provide a method of making such a propellant charging head, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENT

Figure 1:
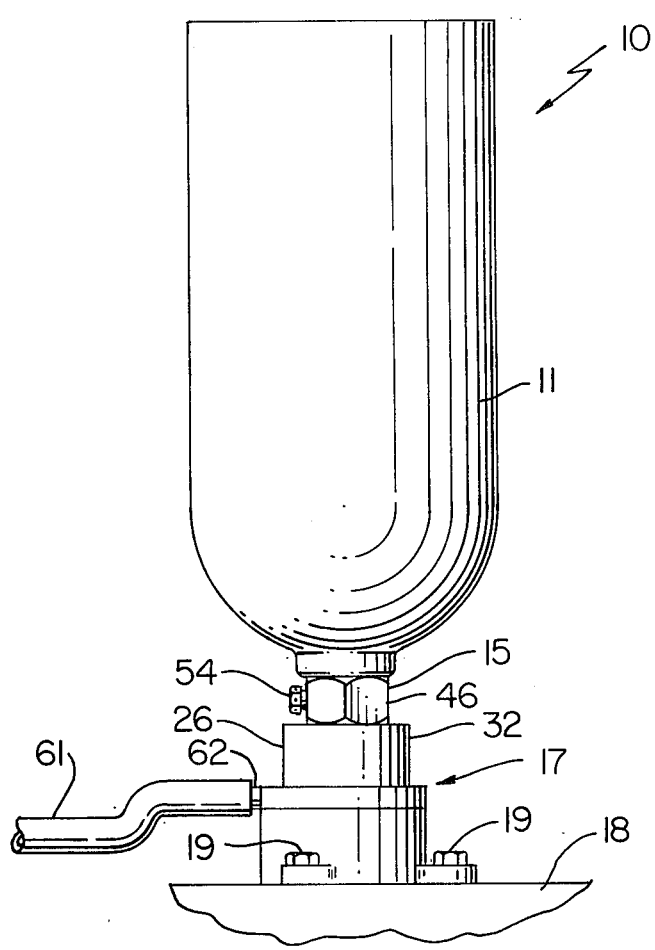
FIG. 1 is a fragmentary side view of the improved propellant storage construction of the aforementioned copending patent application, Ser. No. 328,942, filed Dec. 9, 1981.

While the various features of this invention are hereinafter described and illustrated as being particularly adapted to provide a method and apparatus for filling a storing chamber of a propellant storage construction with gaseous $CO_2$ for carbonating beverages and the like, it is to be understood that the various features of this invention can be utilized singly or in any combination thereof to provide means for using other types of propellants for other purposes as desired.

Therefore, this invention is not to be limited to only the embodiment illustrated in the drawings, because the drawings are merely utilized to illustrate one of the wide variety of uses of this invention.

Figure 3:
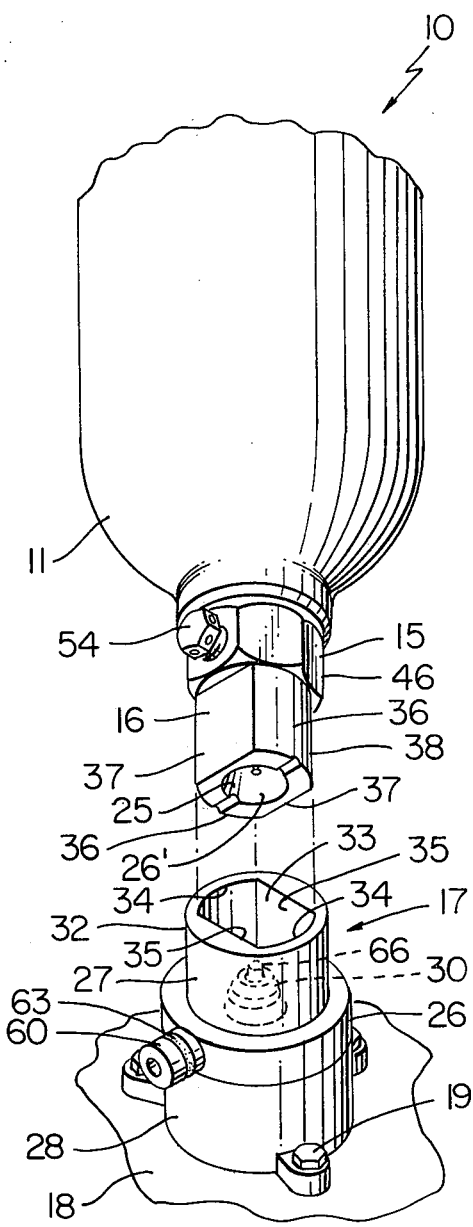
FIG. 3 is an exploded perspective view illustrating one step in the method of the invention for making the propellant storage construction of FIG. 1.
Figure 2:
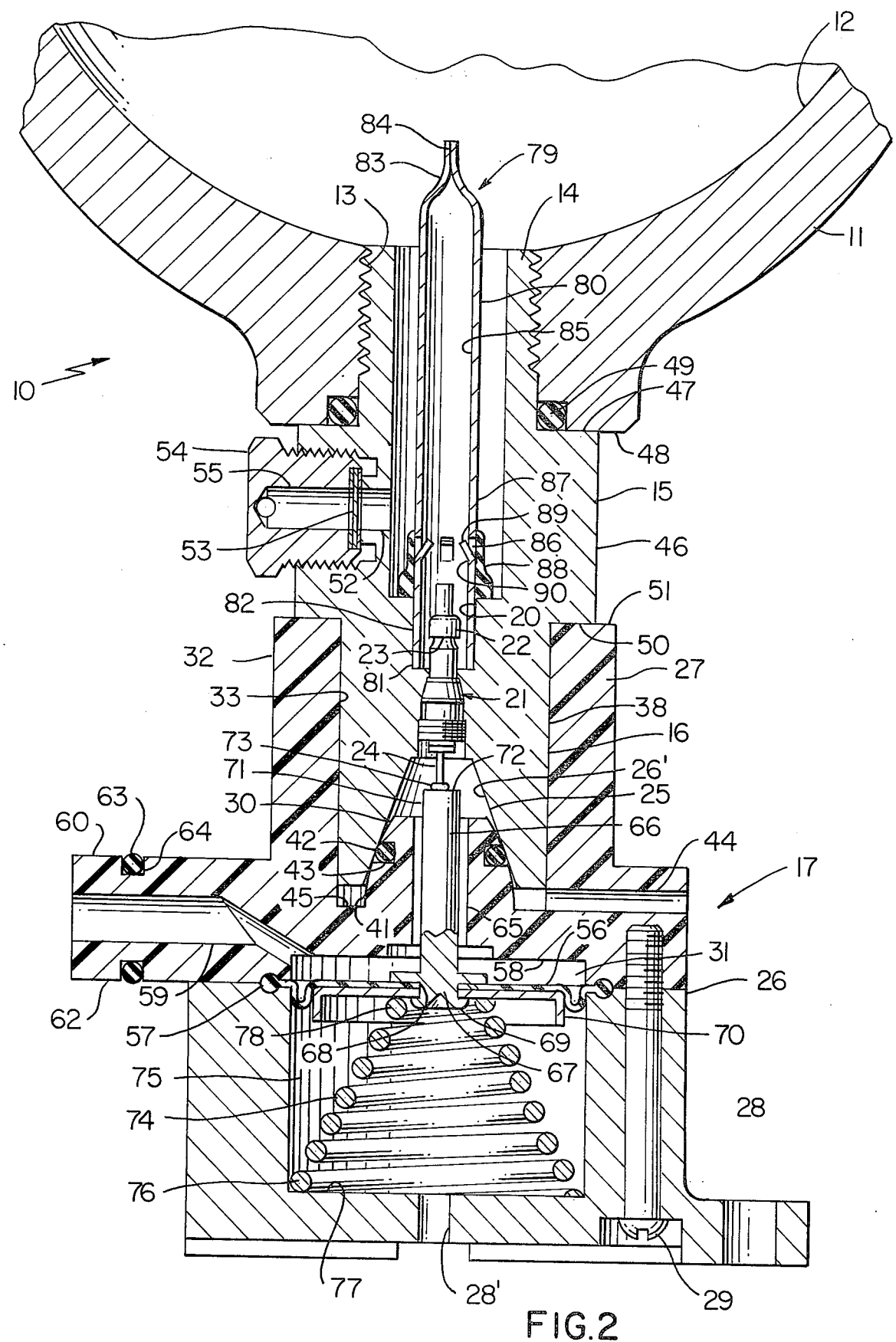
FIG. 2 is an enlarged fragmentary cross-sectional view of the propellant storage construction of FIG. 1.

In order to fully understand the improved method and apparatus of this invention for filling a storage chamber of a propellant storage construction, it is believed best to fully set forth the structure of the type of propellant storage construction to which the features of this invention can be utilized. Therefore, the particular propellant storage construction to which the features of this invention are applied is illustrated in FIGS. 1–3 and comprises the propellant storage construction of aforementioned copending U.S. patent application, Ser. No. 328,942, filed Dec. 9, 1981 and will now be described in detail.

Referring now to FIGS. 1, 2 and 3, the propellant storage construction is generally indicated by the reference numeral 10 and comprises a metallic container 11 having a chamber 12 therein for the storage of a suitable propellant, such as $CO_2$ for carbonating beverages and the like, and having an outlet opening 13 threadedly reveiving a threaded end 14 of a metallic adapter or passage defining means 15 that has its other end 16 detachably secured to a pressure regulator unit that is generally indicated by the reference numeral 17 and is illustrated in FIG. 1 as being secured to a suitable supporting structure 18 by threaded fastening members 19.

The adapter 15 has a stepped passage 20 passing through the opposed ends 14 and 16 thereof and containing a valve unit 21 threrein of the tire-type that has a valve member 22 for opening and closing a valve seat 23 under the control of an axially movable plunger 24 in a manner well known in the art. For example, see the U.S. Pat. No. 3,762,431 to Wilson et al. and such U.S. Patent is being incorporated into this disclosure by this reference thereto.

The stepped passage 20 defines a generally conical seat 25 that has a substantially straight line sidewall 26' when viewed in cross section as illustrated in FIG. 2.

The pressure regulator unit 17 has a housing means 26 formed from housing members 27 and 28 secured together by fastening means 29 with the housing member 27 defining a generally conical nose-like member 30 adapted to be received in the seat 25 of the adapter 15 in the manner illustrated in FIG. 2 to fluidly interconnect the passage 20 of the adapter 15 with an output chamber 31 of the pressure regulator unit 17 formed in a manner hereinafter set forth.

While the housing member 27 of the pressure regulator unit 17 is formed of plastic material and the housing member 28 is formed of metallic material, it is to be understood that other suitable materials can be utilized, if desired.

Also while the adapter 15 is illustrated and described as having the conical seat 25 and the pressure regulator unit 17 is illustrated and described as having the conical nose-like member 30, it is to be understood that the adapter 15 could have the nose-like member 30 and the pressure regulator unit 17 could have the seat 25, if desired.

The housing member 27 of the pressure regulator unit 17 has a tubular portion 32 spaced from and surrounding the nose-like member 30, the tubular portion 32 having an opening 33 therein that is provided with opposed arcuate sidewalls 34 and substantially flat opposed sidewalls 35 to respectively cooperate with a pair of opposed arcuate sidewalls 36 and a pair of opposed flat sidewalls 37 on a projecting portion 38 of the adapter 15 which defines the end 16 thereof.

In this manner, when the inverted container 11 and its adapter 15 are inserted downwardly into the fastened down pressure regulator unit 17 so that the projecting portion 38 of the adapter 15 will be received in the tubular portion 32 of the housing means 17, the opening 33 in the tubular portion 32 guides the end 16 of the adapter 15 in such a manner that the conical seat 25 is telescoped over the conical nose-like member 30 of the pressure regulator unit 17 to fluidly interconnect the same together while the tubular portion 32 and projecting portion 38 function to interconnect the pressure regulator unit 17 to the adapter 15 and, thus, to the container 11 in the manner illustrated in FIG. 1.

It may be found that just the weight of the container 11 and adapter 15 in the inverted position illustrated in FIG. 2 will be sufficient to hold the parts together, particularly if the container 11 is supported either at its top or sidewalls while in the condition illustrated in FIG. 1.

However, it may be found desirable to provide a quick connect-disconnect between the tubular portion 32 of the pressure regulator unit 17 and the projecting portion 38 of the adapter 15 such as can be accomplished by a simple rotational movement of the adapter 15 relative to the pressure regulator 17 after the adapter 15 has been fully received in the opening 33 of the pressure regulator unit 17.

The nose-like member 30 of the pressure regulator unit 17 has a sidewall means 41 that is substantially arcuate when viewed in cross section as illustrated in FIG. 2 and has the convex side thereof facing the seat 25 so that the conical nose-like member 30 permits the seat 25 to slightly swivel thereon as the seat 25 is being seated on the sidewall means 41 of the conical nose-like member 30 so as to insure that an annular resilient sealing member 42 carried in an annular groove 43 formed in the nose-like member 30 will fully seal against the sidewall means 26 of the seat 25 completely around the same as the adapter 15 is being fully inserted into the opening 33 of the pressure regulator unit 17 as illustrated in FIG. 2. Thus, this arrangement allows for slight misalignment between the nose-like member 30 and conical seat 25 while still providing full sealing therebetween.

The tubular portion 32 of the housing member 27 of the pressure regulator unit 17 has a passage 44 that leads to the exterior thereof and is in communication with the opening 33 adjacent the bottom wall 45 thereof to not only prevent a dashpot effect as the end 16 of the adapter 15 is being inserted into the opening 33, but also to permit any grit or the like on the nose-like member 30 to be blown out of the opening 33 as will be apparent hereinafter.

The adapter 15 has an intermediate portion 46 that has a substantially hexagonal configuration as illustrated in FIG. 3 to readily permit standard tools to grasp the same so that the threaded end 14 thereof can be threaded into the threaded opening 13 of the container 11 until a shoulder 47 of the intermediate portion 46 of the adapter 15 bottoms out against an annular shoulder 48 of the container 11, a suitable O-ring sealing member 49 being utilized to seal the surfaces 47 and 48 together.

Also, an annular shoulder 50 defined by the intermediate portion 46 of the adapter 15 can abut against an annular shoulder 51 on the outer end of the tubular portion 32 of the housing member 27 when the conical seat 25 has fully sealed against the annular O-ring 42 of the nose-like member 30 as illustrated in FIG. 2. In this manner, the shoulder 51 will take the full weight of the container 11 and adapter 15 and thereby prevent such full weight from being imposed on the nose-like member 30 of the pressure regulator unit 17.

The intermediate portion 46 of the adapter 15 has a cross opening 52 interconnected to the passage 20 upstream of the valve unit 21 so as to be disposed in fluid communication with the storage chamber 12. In this manner, a conventional rupture or fracture disk 53 can be held in the opening 52 by a threaded retainer 54 so that should the pressure in the chamber 12 exceed a safe level, the same will fracture the disk 53 and be expelled out of an opening means 55 in the retainer 54 in a manner well known in the art.

The pressure regulator unit 17 has a flexible diaphragm 56 provided with an outer peripheral portion 57 held between the housing members 27 and 28 in a manner to cooperate with a wall means 58 of the housing member 27 to define the output chamber 31, the output chamber 31 being interconnected by a passage 59 to a nipple extension 60 of the housing member 27 that is adapted to have a conduit means 61, FIG. 1, slip onto the outer peripheral surface 62 thereof and be sealed thereto by an annular O-ring sealing member 63 carried in an annular groove 64 in the nipple extension 60 in a manner well known in the art.

In addition, the output chamber 31 is interconnected by an opening 65 formed centrally through the nose-like member 30 so as to be fluidly interconnected to the valve unit 21 when the adapter 15 is interconnected to the pressure regulator unit 17 as illustrated in FIG. 2.

The diaphragm 56 carries a plunger 66 which has one end 67 fastened through an opening 68 in a flexible diaphragm 56 by being turned over at 69 against a cup-shaped diaphragm back-up plate 70 while the other end 71 thereof projects loosely through the opening 65 in the conical nose-like member 30 to have its flat end surface 72 abut against the end 73 of the plunger 24 of the valve unit 21 so that movement of the diaphragm 57 controls movement of the plunger 24 of the valve unit 21 and, thus the opening and closing of the valve unit 21 in a manner well known in the pressure regulator art.

A compression spring 74 is disposed in a vented chamber 75 of the housing member 28 and has one end 76 bearing against an internal shoulder 77 of the housing member 28 and the other end 78 thereof bearing against the diaphragm backup plate 70 so that the force of the compression spring 74 tends to move the plunger 66 in a direction to open the valve unit 21, the housing member 28 having a vent opening 28' to interconnect the chamber 75 to the atmosphere.

However, when the adapter 15 is not disposed in the tubular member 32 of the pressure regulator unit 17, the force of the compression spring 74 causes the diaphragm 56 to bottom out against the wall 58 whereby the diaphragm 56 will remain against the wall 58 until the projection 38 of the adapter 15 is inserted down into the opening 33 of the tubular portion 32 of the pressure regulator construction 17 in a manner hereinafter set forth.

In order to prevent ice particles and the like from the storage chamber 12 from reaching the valve unit 21 of the adapter 15, a flow restricting tube means that is generally indicated by the reference numeral 79 in FIG. 2 is utilized, the flow restricting tube means 79 and its function being fully disclosed in the U.S. Pat. No. 3,245,583, to Miller et al, and such U.S. Patent to Miller et al is being incorporated into this disclosure by this reference thereto.

The flow restricting tube means 79 comprises a substantially cylindrical metallic tube 80 having one end 81 press fitted or otherwise secured in a cylindrical section 82 of the passage 20 so as to surround the valve seat 23 of the valve unit 21, the other end 83 of the tube 80 being suitably crimped to provide a small flow opening 84 therein. In this manner, only gaseous propellant is adapted to pass through the restricting opening 84 in the end 83 of the tube 80 to flow through the internal passage 85 thereof and reach the valve seat 23 of the valve unit 21 so that only gaseous propellant will pass out of the valve seat 23 through the valve unit 21 when the same is opened by the plunger 24 in a manner hereinafter set forth.

However, it was found that it is desired to charge the chamber 12 of the container 11 through the valve unit 21 but that such a small opening 84 in the flow restricting means 79 would impede such a filling operation.

Therefore, it was found that suitable opening means 86 could be provided in the sidewall means 87 of the tube 80 and be covered by a flexible sleeve 88 of rubber or the like telescoped onto the tube 80 and having suitable slit means therein aligned with the opening means 86 which will spread open when a charge of propellant is being forced through the valve unit 21 in a direction toward the chamber 12. In particular, the pressure differential acting across the slits in the sleeve 88 adjacent the opening means 86 will open such slits so that the propellant will flow through the opening means 86 and slits in the resilient sleeve 88 to reach the chamber 12 in a rapid manner that cannot be provided by the crimped end 83 of the tube 80, such slitted sleeve 88 being similar to a slitted sleeve illustrated and described in the aforementioned U.S. Pat. No. 3,245,583 to Miller et al, and being utilized for another purpose.

While the openings 86 in the sidewall means 87 of the tube 80 can be formed in any suitable manner, the same are formed by carving substantially integral rectangular tabs 89 in the sidewall means 87 of the tube 80 and bending such tabs 89 inwardly about their integral hinged ends 90 so that the resulting carved through areas of the sidewall means 87 will form the opening means 86 in a relatively simple manner.

Therefore, it can be seen that it is relatively simple methods to form the improved adapter 15 and the improved pressure regulator 17 to cooperate together to form the improved propellant storage construction 10 to be operated in a manner now to be described.

When it is desired to interconnect a container 11 and its adapter 15 to the mounted pressure regulator unit 17, the projecting portion 38 of the adapter 15 is telescoped downwardly into the opening 33 of the tubular portion 32 of the pressure regulator unit 17 and before the conical seat 25 of the projecting portion 38 seats against the conical nose-like member 30, the plunger 24 of the valve member 21 makes contact with the flat end surface 72 of the plunger 71 because the compression spring 74 is holding the diaphragm 56 against the wall 58 of the housing member 27 so that the plunger 24 is moved inwardly relative to the valve unit 21 as the adapter 15 is moving downwardly into the pressure regulating unit 17. Thus, the valve member 22 of the valve unit 21 is moved away from the valve seat 23 so that a flow of propellant from the chamber 12 is adapted to pass through the opened valve unit 21 and blow any grit or adverse material off of the conical seat 25 and the nose-like member 30 and out of the passage 44. However, such exiting of the propellant out of the passage 44 is only temporary because the conical seat 25 then makes contact with the annular sealing member 42 on the nose-like member 30 to completely seal the valve unit 21 from the passage 44 so that the valve unit 21 is only now interconnected to the opening 65 passing through the nose-like member 30 and, thus, to the output chamber 31 of the pressure regulator unit.

Once the adapter 15 has its seat 25 seated on the nose-like member 30 of the pressure regulator unit 17, the valve unit 21 remains in an open condition so that propellant from the storage chamber 12 passes to the output chamber 31 and tends to create a pressure differential acting across the diaphragm 56 in a manner to move the diaphragm 56 in opposition to the force of the compression spring 74. Thus, once the pressure in the output chamber 31 exceeds a certain value, the diaphragm 56 is then moved downwardly in FIG. 2 a sufficient distance to cause the plunger 24 of the valve unit 21 to close the valve member 22 against the valve seat 23 to terminate the flow of propellant in the storage chamber 12 to the output chamber 31.

However, when the conduit 61 is drawing off propellant from the output chamber 31 for any desired use thereof, the drop in pressure in the chamber 31 causes the compression spring 74 to move the diaphragm 56 upwardly to again open the valve unit 21 so that the pressure regulator unit 17 will continuously supply propellant to the output chamber 31 and, thus, to the conduit 61 at a reduced pressure value from the pressure of the propellant in the chamber 12 in a manner well known in the pressure regulator art.

As previously stated, during the flow of propellant through the open valve unit 21 to the output chamber 31, the crimped end 83 of the flow restricting tube means 79 prevents any ice crystals from reaching the valve unit 21 from the storage chamber 21 so that the valve unit 21 will not ice up in an adverse condition that would tend to cause the same to remain in an open condition for reasons fully set forth in the aforementioned U.S. Pat. No. 3,245,583 to Miller et al.

Should it be desired to replace a storage container 11 from the pressure regulator unit 17, it can be seen that all that is required is to have the operator lift the storage container 11 out of the tubular portion 32 of the pressure regulator unit 17 and replace a new container 11 and its adapter 15 in place thereof in the manner previously described so that the used container 11 can be transported to a desired location and be recharged with propellant through the valve unit 21 according to the method and apparatus of this invention as hereinafter set forth.

However, as previously stated, when a charge of propellant is being fed through the valve unit 21 in a direction toward the chamber 12, such propellant will flow through the opening means 86 in the flow restricting tube means 79 and spread apart the slits in the covering resilient sleeve 88 so that a full flow of propellant through the valve unit 21 into the chamber 12 can take place through the flow restricting tube means 79 of this invention. However, after the charging operation, the pressure differential now acting across the sleeve 88 closes the slits therein so that propellant from the chamber 12 cannot enter the tube 80 through the opening means 86.

As previously stated, it is one of the features of this invention to provide an improved method and apparatus for initially charging and/or recharging the chambers 12 of the containers 11 after the same have the adapter assembled thereto.

It was found according to the teachings of this invention that the prior known means for initially charging and/or recharging the propellant storage constructions could not be utilized for the adapters 15 of the propellant storage construction 10 previously described because the prior known propellant charging head was required to be threaded onto the adapter.

Figure 4:
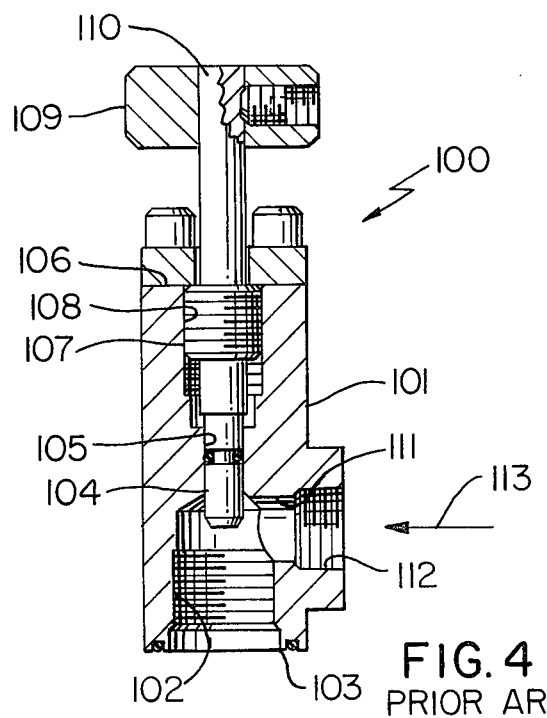
FIG. 4 is a cross-sectional view of the prior known propellant charging head utilized for filling the storing chamber of the propellant storage construction of aforementioned copending U.S. patent application, Ser. No. 326,703 filed Dec. 2, 1981.

For example, reference is made to FIG. 4 wherein such prior known propellant charging head is generally indicated by the reference numeral 100 and comprises a body 101 having an internally threaded opening 102 formed in one end 103 thereof that is adapted to thread onto a threaded end of an adapter, such as the threaded end of the adapter disclosed in the aforementioned copending patent application Ser. No. 326,703, Dec. 2, 1981 so as to cover the passage means therein outboard of the valve unit disposed in the adapter.

An adjustable pin or shaft 104 is disposed in a stepped bore 105 that interrupts the other end 106 of the body 101 of the head 100 and intersects with the threaded opening 102 in coaxially aligned relation therewith, the shaft or pin 104 having an externally threaded portion 107 threadedly disposed in an internally threaded portion 108 of the stepped bore 105 so as to be adjustable therein through rotation of the shaft means 104 such as by grasping and rotating a knob 109 fixed on the outer end 110 of the shaft 104 as illustrated.

A cross bore 111 is formed in the body 10 of the head 100 and intersects with the bore 102, the bore 111 being internally threaded at 112 so as to be threadedly interconnected to a conduit means for a source of propellant which is schematically illustrated by the arrow 113 in FIG. 4.

Thus, when it is desired to utilize the prior known propellant charging head 100, the body 101 is threaded onto the exposed end of the adapter of the propellant storage construction by having the internally threaded bore 102 threaded onto the threaded end of such prior known adapter while the pin 104 has been backed out sufficiently so that the same will not engage the plunger of the valve unit in the passage means of the adapter. Once the body 101 has been fully threaded onto the threaded end of the adapter, the operator then rotates the pin 104 by the knob 109 to cause the pin 104 to move axially inwardly so that the pin 104 will have its lower end 114 engaged against the plunger of the valve unit in the adapter to open the same whereby the supply 113 of the propellant can now pass through the cross bore 111 and main bore 102 of the head 100 and through the opened valve unit to fill the storage chamber of the container.

Once the container has been filled with the desired amount of propellant, the pin 104 is backed out by the knob 109 so as to permit the plunger of the valve unit in the adapter to close. At this time, the body 101 of the head 100 can be removed from the adapter by unscrewing the same from the threaded end thereof.

Accordingly, it can be seen that to utilize such prior known propellant charging head 100 with the adapter 15 of the propellant storage construction 10 of FIGS. 1–3 previously described would not be possible because the end 16 of the adapter 15 is not provided with external threads as the same is required to be received in the opening 33 of the tubular portion 32 of the particular pressure regulator unit 17 previously described.

Therefore, it was found according to the teachings of this invention than an improved propellant charging head could be provided which would be compatible with the end 16 of the propellant storage construction 10 previously described and such improved propellant charging head of this invention is generally indicated by the reference numeral 115 in FIGS. 5 and 6 and will now be described.

Figure 5:
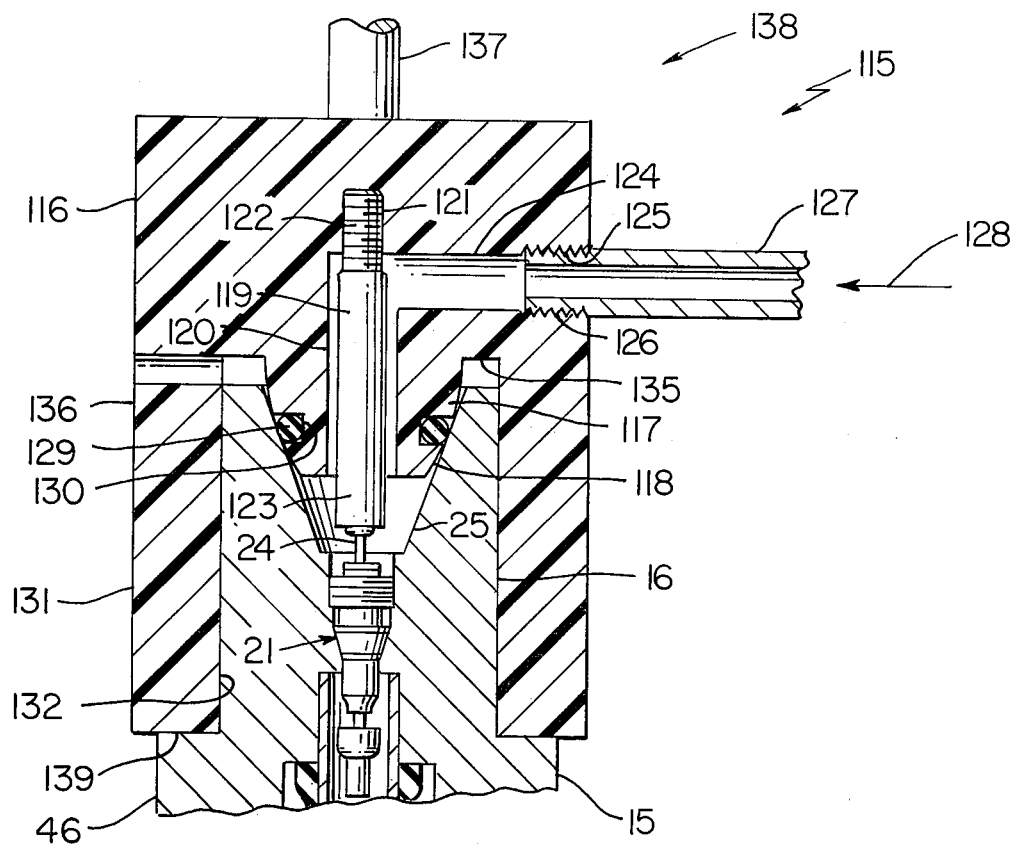
FIG. 5 is a view similar to FIG. 2 and illustrates the improved propellant charging head of this invention in its charging position for charging the propellant storage construction of FIGS. 1–3 by the method and apparatus of this invention.

The propellant charging head 115 of this invention includes a body member 116 formed of any suitable material, such as the plastic material illustrated, and has a nose-like member 117 provided with an arcuate sidewall means 118 formed in substantially the same manner as the nose-like member 30 of the pressure regulator unit 17 except that the same carries a projection or rod 119 for engaging against the plunger 24 of the valve unit 21 carried by the adapter 15 as illustrated in FIG. 5 to hold open the valve unit 21 when the nose-like member 117 is fully received into sealing engagement with the frusto-conical seat 25 in the end 16 of the adapter 15.

In particular, the nose-like member 117 is medially interrupted by a bore 120 that has a reduced internal threaded portion 121 into which a threaded end 122 of the projection 119 is threaded so as to secure the projection 119 concentrically in the bore 120 and permit the free end 123 thereof to project beyond the nose-like member 118 to engage the plunger 24 of the valve unit 21 as illustrated.

A cross bore 124 is formed in the body 116 of the propellant charging head 115 and is internally threaded at 125 to fluidly receive a threaded end 126 of a supply conduit means 127 that is adapted to be interconnected to a source of propellant that is schematically illustrated in FIG. 5 as the arrow 128.

In this manner, the propellant supply 128 is adapted to be interconnected to the passage 120 in the nose-like member 117 to flow through the opened valve unit 21 when the nose-like member 117 of the head 115 is disposed in the seated relation on the seat 25 of the adapter 15, the nose-like member 117 carrying an annular O-ring sealing member 129 in an annular groove 130 thereof in the same manner as the O-ring sealing member 42 disposed in the annular groove 43 of the nose-like member 30 of the pressure regulator unit 17 previously described and for the same purpose.

While it may not be necessary, the body 116 of the propellant charging head 115 of this invention is provided with a tubular portion 131 disposed in concentric relation to the nose-like member 117 and being formed in substantially the same manner as the tubular portion 32 of the housing member 27 of the pressure regulator unit 17.

In particular, the tubular portion 131 of the propellant storage head 115 has an opening 132 therein that is provided with opposed arcuate sidewalls 133 and substantially flat opposed sidewalls 134 to respectively cooperate with the pair of opposed arcuate sidewalls 36 and the pair of opposed flat sidewalls 17 on the projecting portion 38 of the adapter 15 which defines the end 16 thereof in the manner previously described.

Obviously, if it is desired to provide a quick connect-disconnect between the tubular portion 131 of the propellant charging head 115 of this invention and the projecting portion 38 of the adapter 15, this can be accomplished by suitable structure (not shown) whereby a simple rotational movement of the head 115 relative to the adapter 15 after the adapter 15 has been fully received in the opening 132 of the head 115 as illustrated in FIG. 5 will lock the head 115 and adapter 15 together so that unlocking thereof can only be accomplished by rotating the head 115 relative to the adapter 15 to an unlocking position therebetween.

The tubular portion 131 and the nose-like member 117 of the propellant charging head 115 define an end wall 135 that is adapted to be disposed spaced from the end 16 of the adapter 15 when the nose-like member 117 is fully seated against the seat 25, the resulting space between the wall 135 and the end 16 of the adapter 15 being interconnected to the exterior of the head 115 by a cross passage 136 formed in the body 116 as illustrated in FIG. 5 not only to prevent a dash-pot effect as the nose-like member 117 is being received in the seat 25 of the adapter 15, but also to permit any grit or the like on the nose-like member 117 and/or seat 25 to be blown out of the opening 136 as the projection 119 makes contact with the plunger 24 of the valve unit 21 to open the valve unit 21 before the nose-like member 117 fully seats on the seat 25. In this manner, should any propellant remain in the storage container 11 of the respective adapter 15, the same will be expelled out through the opened valve unit 21 to blow off the grit in the same manner as when the storage construction 10 is being inserted into the pressure regulator unit 17 of FIG. 3 as previously described.

Of course, it is to be understood that the propellant source 128 could be initially turned on to also provide a blowoff quantity of propellant as the nose-like member 117 is being initially inserted into the seat 25 of the adapter 15.

While the propellant charging head 115 of this invention can be manually manipulated onto the end 16 of the adapter 15 for the propellant charging operation, the same could be provided with a ram part 137 as illustrated in FIG. 5 so as to be automatically lowered and raised by suitable apparatus as desired.

Figure 6:
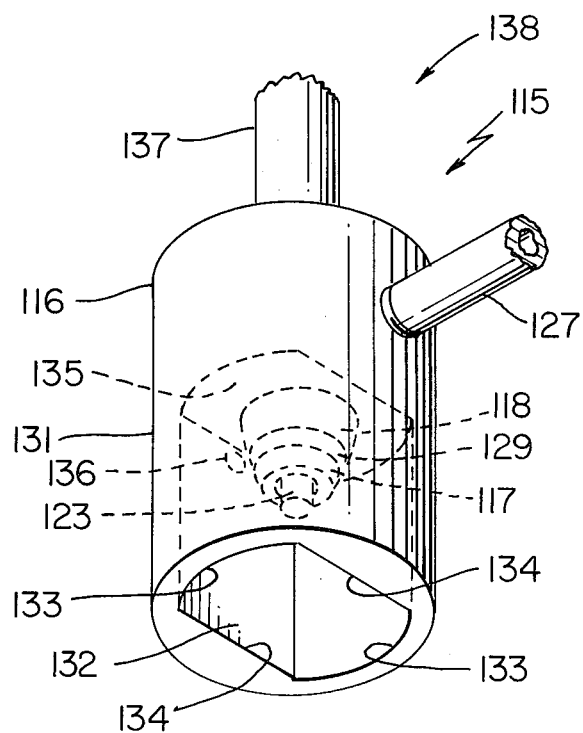
FIG. 6 is a perspective view of the propellant charging head of FIG. 5.

Therefore, the reference numeral 138 in FIGS. 5 and 6 is being utilized to generally indicate the improved method and apparatus of this invention for filling a storing chamber of a propellant storage construction and will be hereinafter described.

Also, the tubular portion 131 of the head 115 of this invention can be provided with an annular surface 139 adapted to abut against the hexagonal medial portion 46 of the adapter 15 so as to take the weight of the head 115 after the annular sealing member 129 in the nose-like member 117 has fully sealed against the conical seat 25 as illustrated in FIG. 5.

Thus, it can be seen that it is a relatively simple method of this invention to make the propellant charging head 115 so as to be adaptable to fit over the end 16 of the adapter 15 of the previously described propellant storage construction 10 to fill the storing chamber 12 of the container 11 thereof with propellant from the source 138 by the method and apparatus 138 of this invention now to be described.

When it is desired to initially charge or recharge a container 11 for use with the aforementioned pressure regulator unit 17, the container 11 with its adapter 15 is disposed in any suitable position, such as vertically upwardly as illustrated in FIG. 5 whereby the head 115 of this invention can be moved downwardly by the ram 137 of the apparatus 138 to cause the tubular portion 131 thereof to telescope around the projecting portion 38 of the adapter 15 and permit the nose-like member 117 to move toward the frusto-conical seat 25. As the head 115 is being so lowered onto the adapter 15, the end 123 of the projection 119 of the head 115 engages the plunger 24 of the valve unit 21 and opens the same before the nose-like member 117 fully seats on the seat 25 so that if any propellant still exists in the container 11 illustrated in FIG. 5, the propellant therein will pass through the open valve unit 21 to blow off any grit, dirt or the like contained on the nose-like member 117 and/or seat 25 out through the opening 136 in the head 115 as previously described. Thereafter, the nose-like member 117 is seated against the frusto-conical seat 25 so that the supply 128 of propellant can be directed through the conduit means 127, passage 124 and opening 120 in the head 115 through the now opened valve unit 21 to fill the storing chamber to the desired pressure level of propellant.

Thereafter, the source 128 of propellant is disconnected from the head 115 by suitable valve means or the like (not shown) and the head 115 is raised vertically upwardly by the ram 137 whereby the nose-like member 117 first unseals from the frusto-conical seat 25 before the plunger 24 of the valve unit 21 causes the valve unit 21 to close so that a rush of propellant through the still opened valve unit 21 will blow across the valve seat 21 and nose-like member 117 to further clean the same. However, as the head 115 continues to move vertically upwardly in FIG. 5, the plunger 24 is permitted to close the valve unit 21 and the head 115 is completely untelescoped from the end 16 of the adapter 15 so that the head 115 can be utilized to recharge or initially charge another propellant storage construction 10 as desired.

Therefore, it can be seen that this invention not only provides an improved method and apparatus for filling a propellant storage construction with propellant, but also this invention provides an improved propellant charging head and method of making the same.

While the forms and methods of this invention now preferred have been illustrated and described as required by the Patent Statute, it is to be understood that other forms and method steps can be utilized and still fall within the scope of the appended claims.

What is claimed is:

1. In a propellant charging head for filling a storing chamber of a propellant storage container with a charge of propellant through a passage defining means of said container that has a valve unit in the passage thereof, said head having a surface, said head having a projection that extends beyond said surface, said head having an opening that interrupts said surface and through which propellant is adapted to flow, said head being adapted to have said surface thereof disposed against said container and have said projection of said head engage a valve plunger of said valve unit to open said valve unit so that propellant can flow from said opening of said head through the opened valve unit to said chamber, the improvement wherein said head has a generally conical nose-like member having said surface of said head thereon, said surface being a generally conical surface and being adapted to seat against a generally conical seat of said container to interconnect said opening of said head to said passage.

2. A propellant charging head as set forth in claim 1 wherein said surface of said nose-like member has sealing means for sealing said nose-like member to said seat.

3. A propellant charging head as set forth in claim 2 wherein said surface of said nose-like member has an annular groove therein, said sealing means comprising an annular sealing member disposed in said annular groove.

4. A propellant charging head as set forth in claim 1 wherein said surface of said nose-like member has side wall means provided with an arcuate cross-sectional configuration that has a convex side thereof adapted to face said seat.

5. A propellant charging head as set forth in claim 1 wherein said nose-like member has said opening interrupting said surface thereof, said projection extending out of said opening and being concentric to said opening.

6. A propellant charging head as set forth in claim 5 wherein said projection is secured to said head.

7. A propellant charging head as set forth in claim 6 wherein said opening of said head defines an internal threaded portion thereof, said projection having one end thereof threaded into said threaded portion to secure said projection to said head.

* * * * *